(12) United States Patent
Ma et al.

(10) Patent No.: US 10,585,583 B2
(45) Date of Patent: Mar. 10, 2020

(54) METHOD, DEVICE, AND TERMINAL APPARATUS FOR TEXT INPUT

(71) Applicant: KIKA TECH (CAYMAN) HOLDINGS CO., LIMITED, Beijing (CN)

(72) Inventors: Shijie Ma, Beijing (CN); Yinan Li, Beijing (CN)

(73) Assignee: KIKA TECH (CAYMAN) HOLDINGS CO., LIMITED, Beijing (CN)

(*) Notice: Subject to any disclaimer, the term of this patent is extended or adjusted under 35 U.S.C. 154(b) by 185 days.

(21) Appl. No.: 15/878,585

(22) Filed: Jan. 24, 2018

(65) Prior Publication Data

US 2018/0232137 A1    Aug. 16, 2018

(30) Foreign Application Priority Data

Feb. 13, 2017  (CN) .......................... 2017 1 0075321

(51) Int. Cl.
*G06F 3/048* (2013.01)
*G06F 17/27* (2006.01)
(Continued)

(52) U.S. Cl.
CPC ........ *G06F 3/04883* (2013.01); *G06F 3/0237* (2013.01); *G06F 3/04886* (2013.01); *G06F 17/276* (2013.01)

(58) Field of Classification Search
CPC ......... G06F 17/30011; G06F 17/30705; G06F 17/27
See application file for complete search history.

(56) References Cited

U.S. PATENT DOCUMENTS

| 7,453,439 | B1* | 11/2008 | Kushler | ................ G06F 3/0237 345/168 |
| 7,694,231 | B2* | 4/2010 | Kocienda | ............ G06F 3/04883 341/20 |

(Continued)

FOREIGN PATENT DOCUMENTS

WO    WO2011082624    *   7/2011

*Primary Examiner* — Scott T Baderman
*Assistant Examiner* — Mario M Velez-Lopez
(74) *Attorney, Agent, or Firm* — Anova Law Group, PLLC

(57) ABSTRACT

A text input method, a text input device and a terminal apparatus are provided. The method includes: sampling a sliding touch trajectory received by a terminal apparatus to obtain a plurality of sampling points, and recording sampling information of each sampling point; determining one or more candidate keys corresponding to each sampling point based on the coordinate information of each sampling point, and filtering the sampling points according to the candidate keys to obtain effective sampling points; determining a skip probability of each effective sampling point and an occurrence probability of a candidate key corresponding to each effective sampling point; obtaining candidate words according to combinations of candidate keys corresponding to the effective sampling points, and determining a candidate probability for each candidate word according to the skip probability and the occurrence probability; and outputting the candidate words in a descending order of candidate probabilities of the candidate words.

14 Claims, 5 Drawing Sheets

(51) Int. Cl.
*G06F 3/0488* (2013.01)
*G06F 3/023* (2006.01)

(56) References Cited

U.S. PATENT DOCUMENTS

| | | | | |
|---|---|---|---|---|
| 7,790,972 | B2* | 9/2010 | Stewart | G10H 1/342 84/423 B |
| 8,359,543 | B2* | 1/2013 | Sengupta | G06F 3/04883 715/702 |
| 8,525,799 | B1* | 9/2013 | Grivna | G06F 3/0416 345/173 |
| 10,082,950 | B2* | 9/2018 | Lapp | G06F 3/04883 |
| 2002/0136371 | A1* | 9/2002 | Bozorgui-Nesbat | G06F 3/0233 379/93.18 |
| 2004/0263487 | A1* | 12/2004 | Mayoraz | G06F 3/0481 345/173 |
| 2005/0169503 | A1* | 8/2005 | Howell | G06F 3/011 382/115 |
| 2006/0077179 | A1* | 4/2006 | Hsu | G06F 3/0216 345/168 |
| 2007/0040813 | A1* | 2/2007 | Kushler | G06F 3/0237 345/173 |
| 2007/0216658 | A1* | 9/2007 | Rainisto | G06F 3/04886 345/173 |
| 2008/0036743 | A1* | 2/2008 | Westerman | G06F 3/038 345/173 |
| 2008/0165255 | A1* | 7/2008 | Christie | G06F 3/04883 348/207.99 |
| 2008/0211766 | A1* | 9/2008 | Westerman | G06F 3/038 345/156 |
| 2009/0237361 | A1* | 9/2009 | Mosby | G06F 3/04883 345/173 |
| 2009/0249258 | A1* | 10/2009 | Tang | G06F 3/04883 715/863 |
| 2011/0260892 | A1* | 10/2011 | Tysowski | G06F 3/0237 341/22 |
| 2013/0004016 | A1* | 1/2013 | Karakotsios | G06K 9/00355 382/103 |
| 2013/0021286 | A1* | 1/2013 | Sudo | G06F 3/018 345/173 |
| 2017/0255278 | A1* | 9/2017 | Aley | G06F 17/276 |
| 2018/0165001 | A1* | 6/2018 | Zou | G06F 3/04883 |

* cited by examiner

METHOD, DEVICE, AND TERMINAL APPARATUS FOR TEXT INPUT

CROSS-REFERENCES TO RELATED APPLICATIONS

This application claims the priority of Chinese Patent Application No. 201710075321.1 filed on Feb. 13, 2017, the entire contents of which are incorporated herein by reference.

TECHNICAL FIELD

The present disclosure relates to the field of information input technologies and, more particularly, to a text input method, a text input device and a terminal apparatus.

BACKGROUND

With the technical developments of electronic devices, intelligent terminal apparatuses including a touch display screen have become more and more popular, which also support increasingly diversified functions. Convenient and fast information input performance of such terminal apparatuses can improve the efficiency of human-machine interaction, and facilitate good operations of these terminal apparatuses and various multimedia functions, thereby enhancing user experience.

As shown in FIG. 1, by utilizing a touch screen 110 of a terminal apparatus and a virtual keyboard 120 displayed on the touch screen 110, a user can input texts using any one of input methods configured in the terminal apparatus. Existing input methods are mainly based on point touch input, that is, a user needs to tap keys corresponding to the characters to be input on the virtual keyboard one by one, and the corresponding program of the input method determines candidate words according to the key values and tap order of the keys tapped by the user. If the user taps one or more keys by mistake, or taps one or more extra keys, or misses one or more keys, it is possible that the user cannot get the desired text and he/she needs to tap keys again for input. For example, if the user wants to input an English word "for", the keys "f", "o", and "r" need to be input on the virtual keyboard 120 sequentially. If the user successively taps "f", "i" and "r", i.e., the user taps the key "i" adjacent to the key "o" by mistake, the obtained candidate word may more likely be "fire", "first", and so on. Or, if the user successively taps keys "f", "o", "u", and "r", i.e., the user taps an extra key "u" after tapping the key "o", the obtained candidate word may more likely be "four", "fourty" and so on. Under all such conditions, the user can hardly get the desired word "for".

In view of the above, the existing point touch-based input methods rely on accurate user clicks on corresponding keys to guarantee the input accuracy and efficiency. However, most of the existing terminal apparatuses have a small sized touch screen, and the distances between keys on the virtual keyboard are thus relatively short, which results in a high chance for the occurrence of tapping errors when users perform input operations. Accordingly, the accuracy and efficiency of text input is affected. Further, the point touch-based input method requires the users to perform tapping and releasing operations for several times, which also causes negative effects on the input efficiency.

SUMMARY

Embodiments of the present disclosure provide a text input method, a text input device and a terminal apparatus, which are capable of solving the issues in existing point touch-based input methods that a relatively high requirement on the accuracy of user operation is desired, relatively complicated operation actions are often needed, and the input efficiency is low.

According to a first aspect of embodiments of the present disclosure, there is provided a text input method, including steps of:

sampling a sliding touch trajectory detected by a terminal apparatus to obtain a plurality of sampling points, and recording sampling information of each sampling point, where the sampling information includes at least coordinate information of each sampling point;

determining one or more candidate keys corresponding to each sampling point based on the coordinate information of each sampling point, and filtering the sampling points according to the candidate keys to obtain effective sampling points;

determining a skip probability of each of the effective sampling points and an occurrence probability of a candidate key corresponding to each of the effective sampling points;

obtaining candidate words according to combinations of the candidate keys corresponding to the effective sampling points, and determining a candidate probability of each of the candidate words according to the skip probability and the occurrence probability; and outputting the candidate words in a descending order of candidate probabilities of the candidate words.

According to a second aspect of embodiments of the present disclosure, there is provided a text input device, including:

a sampling module configured to sample a sliding touch trajectory detected by a terminal apparatus to obtain a plurality of sampling points, and record sampling information of each sampling point, where the sampling information includes at least coordinate information of each sampling point;

a sampling point filtering module configured to determine one or more candidate keys corresponding to each sampling point based on the coordinate information of each sampling point, and filter the sampling points according to the candidate keys to obtain effective sampling points;

a sampling point probability determination module configured to determine a skip probability of each of the effective sampling points and an occurrence probability of a candidate key corresponding to each of the effective sampling points;

a candidate word determination module configured to obtain candidate words according to combinations of candidate keys corresponding to the effective sampling points, and determine a candidate probability of each of the candidate words according to the skip probability and the occurrence probability; and a candidate word output module configured to output the candidate words in a descending order of candidate probabilities of the candidate words.

According to a third aspect of embodiments of the present disclosure, there is provided a terminal apparatus, including a touch screen, a memory and a processor, wherein:

the touch screen is configured to display a virtual keyboard, and sense a sliding touch operation to obtain a sliding touch trajectory;

the processor is configured to execute the computer executable instructions or programs stored in the memory such that partial or all of the steps in the text input method according to the first aspect are implemented.

As can be seen from the above technical solutions, in the embodiments of the present disclosure, the sliding touch trajectory resulted from a sliding operation executed by the user on a touch screen may be detected. By sampling and filtering the sliding touch trajectory, a plurality of effective sampling points and candidate keys associated with the effective sampling points may be obtained. Further, a skip probability of each sampling point and an occurrence probability of each candidate key may be analyzed, and according to a preset language model, candidate character sequences (candidate words) with real meaning may be obtained. Further, a candidate probability of each candidate character sequence may be obtained according to the skip probability and the occurrence probability of each candidate key. One or more candidate words having highest candidate probabilities can be output for display, so that the user can select actually desired input content from the displayed candidate words.

By the embodiments of the present disclosure, the user does not need to input multiple target characters by performing several times of tapping and releasing operations. Instead, the user can perform one sliding operation to make the sliding touch trajectory to pass all the target characters. During such procedure, the user's finger or a touch pen used by the user does not need to leave the virtual keyboard, and the transition from one character to another character is realized by the sliding operation. For each input, only one tapping and releasing operation is needed, which can greatly reduce input operations of the user and make the input procedure continuous. Consequently, the input speed and efficiency can be improved.

In addition, embodiments of the present do not require that one specific candidate key has to occur in a candidate character sequence. Instead, embodiments of the present disclosure calculate the occurrence probability of each candidate key and the skip probability of each effective sampling point, determine whether various combinations of the candidate keys can result in a meaningful character sequence according to a language model, calculate the candidate probability associated with each meaningful character sequence according to the occurrence probability and the skip probability, and output the candidate words in a descending order of the candidate probabilities. Thus, compared to the input methods based on point touch, the technical solutions provided by embodiments of the present disclosure have a higher error-tolerant rate and lower requirements on the accuracy of the user input, which further improves the input efficiency.

BRIEF DESCRIPTION OF THE DRAWINGS

In order to explain technical solutions of the present disclosure more clearly, drawings used when describing embodiments of the present disclosure will be described hereinafter briefly. It is apparent that one of ordinary skill in this art may derive other drawings according to such drawings without creative labor.

DETAILED DESCRIPTION

Embodiments of the present disclosure provide a text input method, a text input device and a terminal apparatus, thereby solving the issues in existing point touch-based input methods that a relatively high requirement on the accuracy of user operation is desired, relatively complicated operation actions are often needed, and the input efficiency is low. Technical solutions provided by embodiments of the present disclosure will be described in detail hereinafter with reference to the accompanying drawings.

Figure 1:
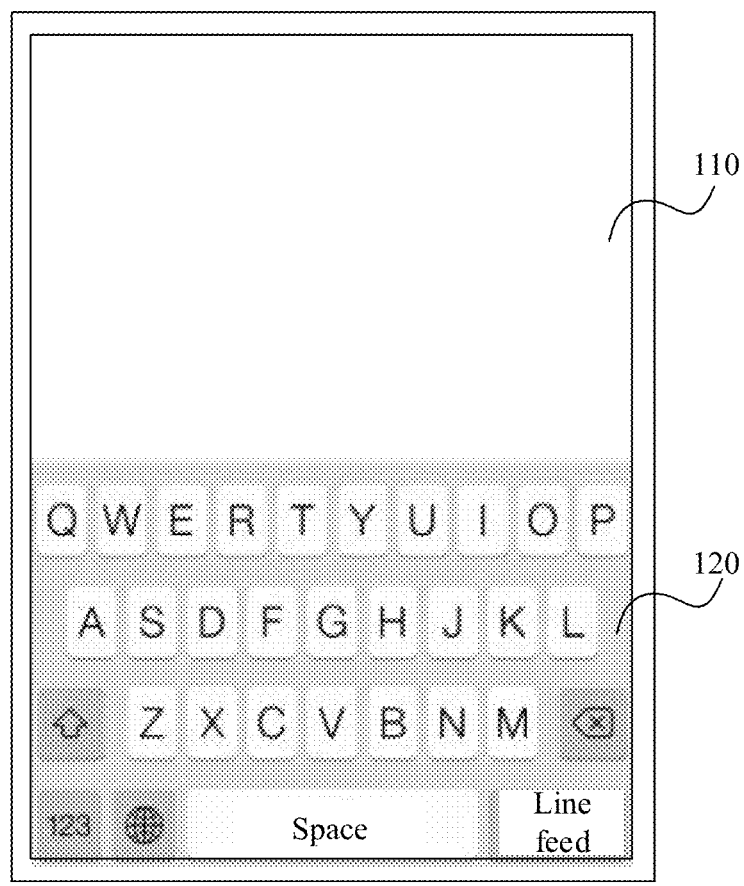
FIG. 1 is a schematic diagram of a virtual keyboard displayed on a touch screen of a terminal apparatus.
Figure 2:
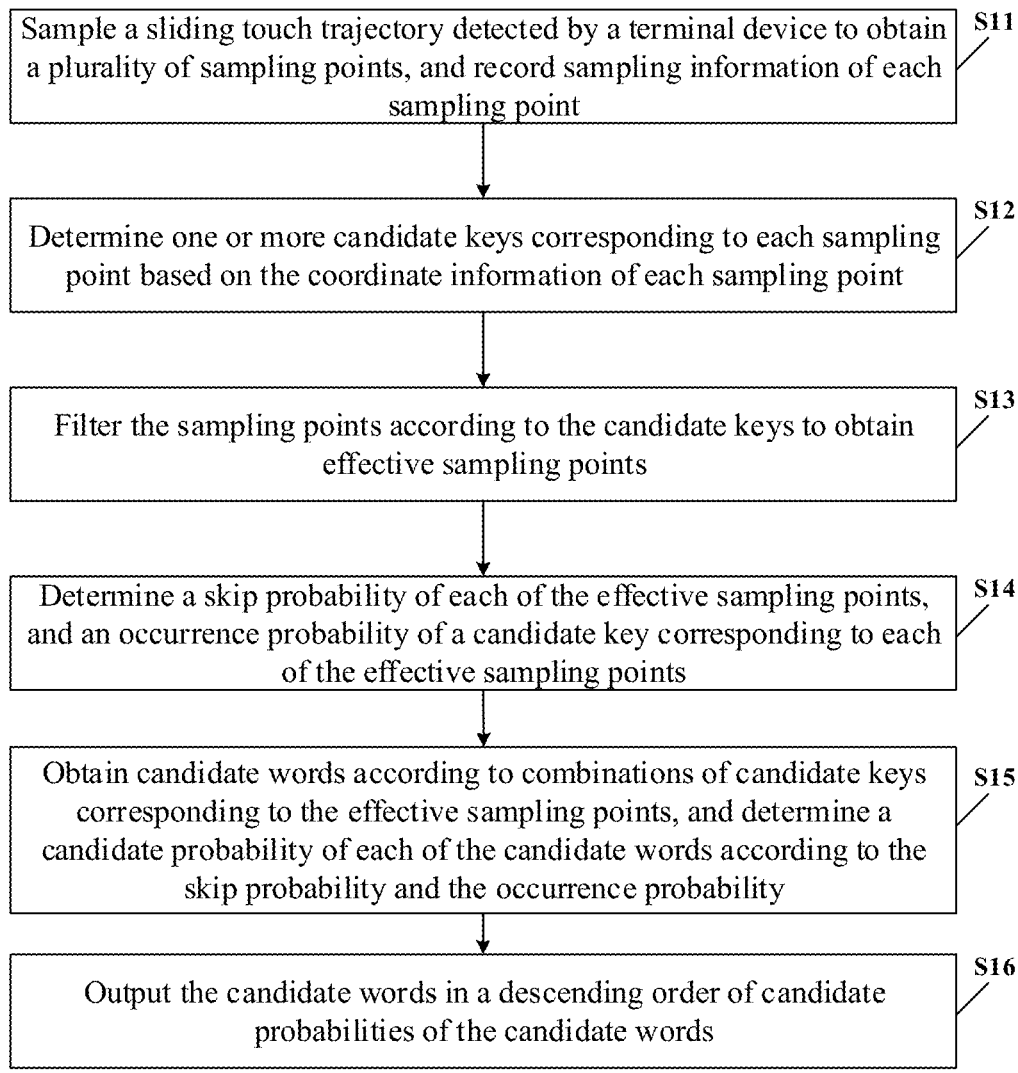
FIG. 2 is a flowchart showing a text input method according to an embodiment of the present disclosure.

FIG. 2 is a flowchart showing a text input method according to an embodiment of the present disclosure. The method may include the following steps.

In S11, a sliding touch trajectory received by a terminal apparatus is sampled to obtain a plurality of sampling points, and sampling information of each sampling point is recorded.

A user can perform a sliding operation on a virtual keyboard area displayed on a touch screen of a terminal apparatus. The terminal apparatus records the trajectory resulted from the user's sliding operation to obtain the sliding input trajectory. The principle of embodiments of the present disclosure is as follows: by processing the sliding input trajectory, effective key codes that the trajectory passes may be determined, and candidate words may be obtained by combinations of the effective key codes for selection by the user for input.

Because the sliding input trajectory can be deemed as including innumerable points. In order to determine the key codes that the sliding input trajectory passes, sampling needs to be performed on the sliding input trajectory to obtain a plurality of sampling points. Specifically, sampling may be performed during the sliding operation performed by the user according to a preset sampling period T, and the sampling information may be recorded.

The sampling period T may often be set as between approximately 6 ms and 20 ms, or may be set by the user according to the speed of his/her sliding operation. The higher the speed of the sliding operation, the shorter the sampling period, such that the distances between sampling points may not be too large and the key sampling points may not be omitted. The slower the speed of the sliding operation, the longer the sampling period may be set, such that the distances between sampling points the may not be too small and the existence of a relatively large number of ineffective sampling points may be avoided.

In embodiments of the present disclosure, the sampling information may include at least coordinate information of each sampling point so as to determine keys surrounding each sampling point. The sampling information may further include sampling time of each sampling point (the sampling time may be determined based on the system time), so as to compute the sliding speed corresponding to each sampling point in conjunction with the coordinate information.

Figure 3:
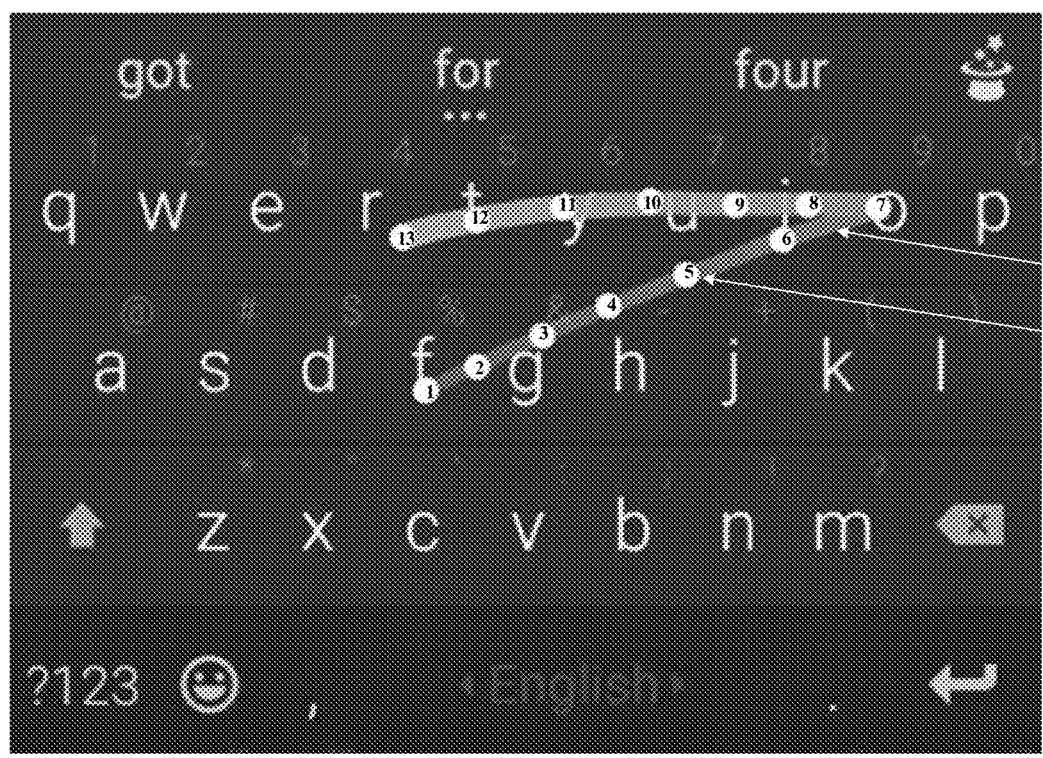
FIG. 3 is a schematic diagram showing a sliding touch trajectory obtained under a practical scenario and a sampling process on the sliding touch trajectory using an embodiment of the present disclosure.

Referring to FIG. 3, when a user's finger or a touch pen touches a virtual keyboard, sampling is started. The starting point indicated by 1 in FIG. 3 is taken as the first sampling point, and the sampling information of the sampling point 1 is recorded; after the time period T, the touch position reaches the point indicated by 2, the point 2 is sampled, and the sampling information of the point 2 is recorded, and so on. During the whole sliding procedure, a total number of 13 sampling points are obtained, i.e., sampling points indicated, by 1 to 13 are obtained.

The sampling point indicated by 13 corresponds to an ending point of the sliding touch trajectory, and the time interval between the sampling point indicated by 13 and a preceding sampling point (i.e., the sampling point indicated by 12) may be smaller than the sampling period. Because it is likely that the position of the end point is the key position corresponding to the last character input by the user, it is necessary to use the end point as a sampling point. That is, even if the sampling period does not come to an end when the sliding operation ends, the last sampling needs to be performed to obtain the sampling information of the end point.

In S12, one or more candidate keys corresponding to each sampling point are determined based on the coordinate information of each sampling point.

The position of each key of the virtual keyboard on the touch screen is fixed. Thus, in one implementation of the present disclosure, the position of each key may be represented by the coordinates of the center point of the key on the touch screen. Further, for each sampling point, according to the coordinate information of the sampling point and the coordinate information of each key, distances from the sampling point to the keys can be calculated. Further, the keys showing a distance to the sampling point smaller than the preset distance threshold may be selected, such as one or more keys closest to the sampling point. That is, the candidate keys corresponding to the sampling point may be obtained, i.e., the key codes that the user desires to input may be obtained. Optionally, the preset distance threshold may be twice of the key width of a single key on the virtual keyboard or other values.

Referring to FIG. 3, the candidate keys corresponding to the sampling point indicated by 1 may include "f", "g", "c", "d" and so on, the candidate keys corresponding to the sampling point indicated by 2 may include "f", and "g" and so on, and the candidate keys corresponding to the sampling point indicated by 3 may include "g", "h", "t", and "y", etc.

In S13, the sampling points are filtered according to the candidate keys to obtain effective sampling points.

During an actual sliding operation, when the user slides from the key corresponding to one key code to the key corresponding to another key code to be input, a relatively long sliding touch trajectory may be obtained, such that in addition to the sampling points corresponding to the two key codes to be input by the user, one or more other sampling points may be obtained. Further, taking into the consideration the real input intention of the user, the "one or more other sampling points" are ineffective sampling points. Thus, in order to determine the user's input intention more accurately and obtain the candidate words more accurately and faster, after the sampling is finished, the sampling points need to be filtered to remove the ineffective sampling points and keep only the effective sampling points.

Optionally, three types of special sampling points in the sliding touch trajectory need to be taken as effective sampling points, including the starting point (e.g., the sampling point indicated by 1 in FIG. 3), the end point (e.g., the sampling point indicated by 13 in FIG. 3), and inflection point(s) (e.g., the sampling point indicated by 7 in FIG. 3). For other sampling points, whether each of the other sampling points is an effective sampling may be determined in conjunction with factors such as the candidate keys of each sampling point or the aforementioned special sampling points.

In S14, a skip probability of each of the effective sampling points, and an occurrence probability of a candidate key corresponding to each of the effective sampling points are determined.

In embodiments of the present disclosure, if a sampling point is skipped, it is indicated that the candidate keys corresponding to the sampling point are irrelevant to the real input intention of the user and are not in the candidate character sequences. According to the principle of probability theory, for any one of the sampling points, there are two and only two situations: skipped and not skipped. If the sampling point is not skipped, the probability for selecting one of the candidate keys corresponding to the sampling point and adding the selected candidate key to a candidate character sequence is the occurrence probability of the candidate key. Thus, the sum of the skip probability of one sampling point and the occurrence probabilities of the candidate keys corresponding to the sampling point is equal to one.

Referring to FIG. 3, for the sampling point indicated by 1, if it is assumed, that the skip probability of the sampling point is $P_{00}$ the occurrence probability of the candidate key "f" is $P_{01}$, the occurrence probability of the candidate key "g" is $P_{02}$, the occurrence probability of the candidate key "c" is $P_{03}$, and the occurrence probability of the candidate key "d" is $P_{04}$, then:

$$P_{00}+P_{01}+P_{02}P_{03}+P_{04}=1.$$

In S15, candidate words are obtained according to combinations of candidate keys corresponding to the effective sampling points, and a candidate probability of each of the candidate words is determined according to the skip probability and the occurrence probability.

In embodiments of the present disclosure, for each effective sampling point, one candidate key is selected or the effective sampling point is skipped. The selection results for the effective sampling points are combined to obtain a set of candidate character sequences. For each candidate character sequence, by searching in a preset language model (for example, an English word thesaurus for storing a huge quantity of English words and phrases, a Chinese thesaurus for storing a large quantity of Chinese characters or phrases in the form of stroke or pinyin), whether the candidate character sequence is in the language model is determined. If the candidate character sequence is in the language model, it is indicated that the candidate character sequence is a meaningful sequence; and if the candidate character sequence is not in the language model, it is indicated that the candidate character sequence is a meaningless sequence, and the sequence may be deleted from the set. If the searching is finished, the meaningful candidate character sequences left in the set may be taken as the candidate words. Further, the product of the selection probabilities of the sampling points corresponding to each of the candidate words can be calculated as the candidate probability of the candidate word.

Referring to FIG. 3 again, it is assumed that after the filtering operation in step S13, a total number of 6 sampling points among the 13 sampling points are determined as the effective sampling points, i.e., the sampling points indicated by 1, 3, 5, 7, 10 and 13 are selected as the effective sampling points. The skip probability of each effective sampling point and the occurrence probabilities of the candidate keys corresponding to the sampling point are as shown in Table 1.

acter sequence "for", and the candidate sequence "for" may be directly output as a candidate word. Further, the sequence "for" may be complemented, or context association may be performed on "for" to obtain candidate words such as "forty", "foreign" and so on. Or, in the Chinese input mode, for the candidate character sequence "four", the complete pinyin "fouren" may be obtained after the processing of completion to further obtain the candidate word

TABLE 1

| effective sampling point 1 | | effective sampling point 3 | | effective sampling point 5 | | effective sampling point 7 | | effective sampling point 10 | | effective sampling point 13 | |
|---|---|---|---|---|---|---|---|---|---|---|---|
| candidate | probability | candidate | probability | candidate | probability | candidate | probability | candidate | probability | candidate | probability |
| skip | $P_{00}$ | skip | $P_{10}$ | skip | $P_{20}$ | skip | $P_{30}$ | skip | $P_{40}$ | skip | $P_{50}$ |
| f | $P_{01}$ | g | $P_{11}$ | u | $P_{21}$ | o | $P_{31}$ | u | $P_{41}$ | r | $P_{51}$ |
| g | $P_{02}$ | h | $P_{12}$ | j | $P_{22}$ | i | $P_{32}$ | y | $P_{42}$ | t | $P_{52}$ |
| c | $P_{03}$ | t | $P_{13}$ | h | $P_{23}$ | p | $P_{33}$ | h | $P_{43}$ | f | $P_{53}$ |
| d | $P_{04}$ | y | $P_{14}$ | — | — | — | — | — | — | d | $P_{54}$ |

Referring to Table 1, when forming a candidate character sequence, in one example, for the effective sampling point 1, the candidate key "g" is selected; the effective sampling point 3 is skipped; the effective sampling point 5 is skipped; for the effective sampling point 7, the candidate key "o" is selected; for the effective sampling point 10, the candidate key "u" is selected; and for the effective sampling point 13, the candidate key "r" is selected. Under such condition, the resulted candidate character sequence is "four". In another example, for the effective sampling point 1, the candidate key "f" is selected; the effective sampling points 3 and 5 are skipped; for the effective sampling point 7, the candidate key "o" is selected; the effective sampling point 10 is skipped; and for the effective sampling point 13, the candidate key "r" is selected. Under such condition, the resulted candidate character is "for".

In such a way, many candidate character sequences can be obtained. When forming candidate character sequences, there are five options for the effective sampling point 1 ("skip" and four candidate keys), and there are five, four, four, four, and five for the other effective sampling points, respectively. Thus there will be 5*5*4*4*4*5−1=7999 candidate character sequences by combining all the options for the six effective sampling points ("−1" in the equation represents that the situation where all of the six effective sampling points are "skipped" is removed).

As such, search may be conducted in preset language models to determine whether candidate character sequences exist, and character sequences which cannot be found in the language models can be deleted. In such a manner, candidate character sequences having an actual meaning and candidate words corresponding to the candidate character sequences are obtained.

Optionally, for each candidate character sequence, if it is determined that the candidate character sequence cannot be found in a language model after one search, the candidate character sequence can be corrected, or complemented, or context association can be conducted for the candidate character sequence. Further, another search may be performed to determine whether the processed candidate character sequence can be found in the language model to obtain more meaningful candidate sequences.

For example, under an English input mode, for the candidate character sequence "for", there is one word "for" in the language model which matches the candidate char- "否认 meaning 'deny' or 'denial' in English, and having pinyin expression of 'fouren').

Further, according to the probabilities as shown in Table, the candidate probability of the candidate character sequence "for" may be calculated as:

$P(\text{"for"})=P_{01}*P_{10}*P_{20}*P_{31}*P_{40}*P_{51}$

In S16, the candidate words are output in a descending order of candidate probabilities of the candidate words.

Figure 4:
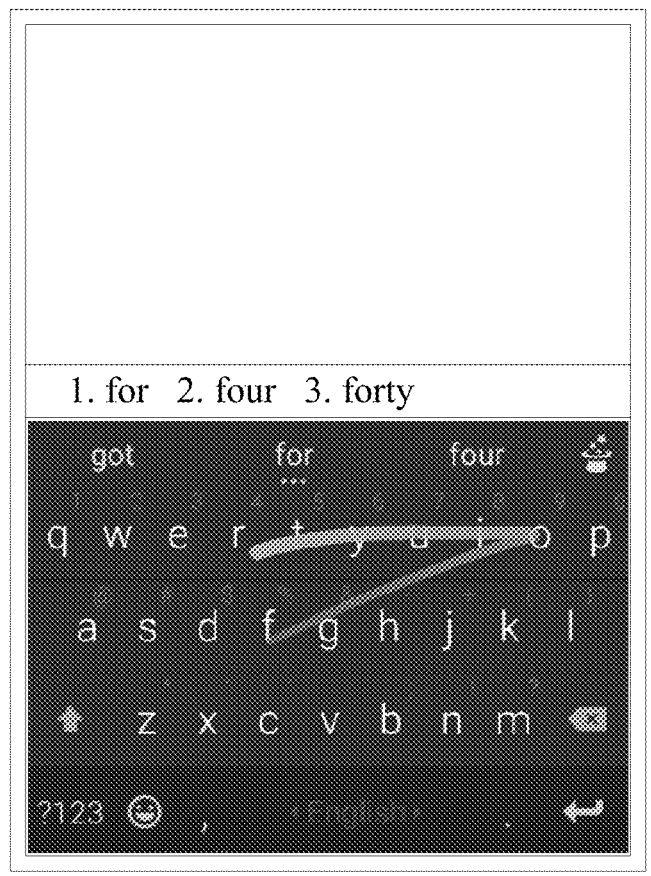
FIG. 4 is a schematic diagram showing output of candidate words according to an embodiment of the present disclosure.

The greater the candidate probability of one candidate word, the closer the candidate word to the user's real input intention. Thus, in an embodiment of the present disclosure, the candidate words are displayed in a candidate input box in a descending order of the candidate probabilities of the candidate words. Referring to FIG. 3 again, in one example, if the candidate words with the highest three probabilities are "for", "four" and "forty", the output display result is as shown in an interface of FIG. 4.

As can be seen from the aforementioned embodiments of the present disclosure, the sliding touch trajectory resulted from a user's sliding operation on a touch screen may be received or detected. By processing, such as sampling and filtering, of the sliding touch trajectory, a plurality of effective sampling points and candidate keys associated with the effective sampling points may be obtained. By analyzing a skip probability of each sampling point and an occurrence probability of each candidate key, according to a preset language model, candidate character sequences (candidate words) having an real meaning may be obtained, and a candidate probability of each candidate character sequence may be obtained according to the skip probability and the occurrence probability of each candidate key. One or more candidate words having high candidate probabilities can be output and presented before the user, so that the user can select one of the presented candidate words to input desired contents.

By the embodiments of the present disclosure, the user does not need to input multiple target characters by performing several times of tapping and releasing operations. Instead, the user can perform one sliding operation to make the sliding touch trajectory to pass all the target characters. During this procedure, the user's finger or the touch pen does not need to leave the virtual keyboard, and the transition from one character to another character is realized by the sliding operation. For each input, only one tapping and releasing action is needed, which can greatly reduce user's input actions, and make the input procedure continuous. Consequently, the input speed and efficiency can be improved.

In addition, embodiments of the present do not require that one specific candidate key has to occur in a candidate character sequence. Instead, embodiments of the present disclosure calculate the occurrence probability of each candidate key and the skip probability of each effective sampling point, determine whether various combinations of the candidate keys can result in a meaningful character sequence according to a language model, calculate the candidate probability associated with each meaningful character sequence according to the occurrence probability and the skip probability, and output the candidate words in a descending order of the candidate probabilities. Thus, compared to the input methods based on point touch, the technical solutions provided by embodiments of the present disclosure have a higher error-tolerant rate and lower requirements on user input accuracy, which further improves the input efficiency.

In a possible implementation of the present disclosure, the filtering of the sampling points to obtain effective sampling points in the above step S13 may include the following steps.

In S131, a first sampling point corresponding to a starting point of the sliding touch trajectory is marked as an effective sampling point.

Often, the starting point of the sliding touch trajectory is located near the first character to be input by the user, and thus the first sampling point corresponding to the starting point is taken as an effective sampling point.

In S132, each sampling point other than the first sampling point are successively used as a current sampling point, and whether the current sampling point is an effective sampling point is determined according to a candidate key and/or a rotation angle of the current sampling point.

In embodiments of the present disclosure, whether a sampling point is an effective sampling point can be determined according to candidate keys of each sampling point, or the rotation angle of each sampling point, or a combination thereof. The specific determination steps will be described below in detail.

In a possible implementation of the present disclosure, whether a current sampling point is an effective sampling point may be determined according to candidate keys of the current sampling point. Specific steps may be as follows.

In S21, whether there is a common candidate key shared by the current sampling point and the preceding effective sampling point, or shared by the current sampling point and the succeeding sampling point is determined.

In S22, if there is the common candidate key, whether the distance from the current sampling point to the common candidate key with respect to the distances from the current sampling point to the preceding effective sampling point and the succeeding sampling point is the smallest is determined.

In S23, if the current sampling point is the closest to the common candidate key, or if there is no common candidate key, the current sampling point is marked as an effective sampling point.

If there is a common candidate key shared by two sampling points, it is indicated that the two sampling points are very close to each other, and it is very likely that one of the two sampling points is a redundant ineffective sampling point. If it is determined in step S21 that there is a common candidate key shared by the current sampling point and the preceding effective sampling point, or shared by the current sampling point and the succeeding sampling point, to more clearly determine whether the current sampling point is an effective sampling point, the distances from the common candidate key to the current sampling point and another sampling point (i.e., the preceding effective sampling point, or the succeeding sampling point) may be compared.

Optionally, if the distance from the common candidate key to the current sampling point is shorter, it is indicated that the common candidate key is more suitable for use as the candidate key of the current sampling point. Thus, the current sampling point can be taken as an effective sampling point so that the common candidate key can have a more suitable position (the character position corresponding to the current sampling point) in the candidate character sequence. If the distance from the common candidate key to a sampling point other than the current sampling point is shorter, it is indicated that the common candidate key is more suitable for use as the candidate key of the sampling point, and thus the current sampling point can be taken as an ineffective sampling point.

In addition, if it is determined in step S21 that there is no common candidate key shared by the current sampling point and the preceding effective sampling point, or shared by the current sampling point and the succeeding sampling point, it is indicated that the two sampling points are relatively far from each other. In order to make the candidate keys corresponding to the current sampling point to appear in a candidate character sequence, the current sampling point may be taken as an effective sampling point.

Referring to FIG. 3, analysis and determination are performed on each sampling point based on the sliding touch trajectory.

First, for the sampling point 1, because the sampling point 1 is the first sampling point (i.e., the starting point), the sampling point 1 is directly determined as an effective sampling point.

Second, for the sampling point 2, the candidate keys of the sampling point 2 include "f" and "g", and because the candidate keys of the preceding effective sampling point (i.e., the effective sampling point 1) include "f", "g", "c" and "d", there are common candidate keys "f" and "g" shared by the sampling points 1 and 2. Obviously, the common candidate key "f" is closer to the effective sampling point 1. Further, the candidate keys of the succeeding sampling point (i.e., the sampling point 3) of the sampling point 2 include "g", "h", "t" and "y", there is a common candidate key "g" shared by the sampling points 2 and 3. Obviously, the common candidate key "g" is closer to the sampling point 3. In view of the above analysis, it can be seen that the candidate keys of the sampling point 2 appear in the candidate keys of the sampling points adjacent to the sampling point 2 and are closer to the adjacent sampling points. Thus, the sampling point 2 is taken as an ineffective sampling point.

Third, for the sampling point 3, the candidate keys of the sampling point 3 include "g", "h", "t" and "y", and the candidate keys of a preceding effective sampling point (i.e., the effective sampling point 1) include "f", "g", "c" and "d". Thus, there is a common candidate key "g" shared by the current sampling point 3 and the preceding effective sampling point 1, and the common candidate key "g" is closer to the sampling point 3. The candidate keys of the succeeding sampling point (i.e., the sampling point 4) of the sampling point 3 include "h", "g", "y" and "u", and there are common candidate keys "g" and "h" shared by the current sampling point 3 and the succeeding sampling point 4. Further, the common candidate key "g" is closer to the sampling point 3. In view of the above analysis, to guarantee that "g" appears at a character position closest to the sampling point 3 in a candidate character sequence, the sampling point 3 can be taken as an effective sampling point.

Fourth, for the fourth sampling point 4, similar analysis can be performed to determine whether the sampling point 4 can be taken as an effective sampling point. And, whether other sampling points (e.g., sampling points 5~13) are effective sampling points can be determined in the same way.

In a possible implementation of the present disclosure, whether a current sampling point is an effective sampling point may be determined according to a rotation angle of the current sampling point.

Figure 5:
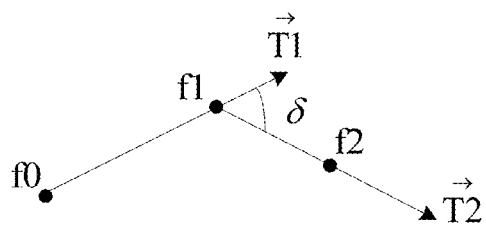
FIG. 5 is a schematic diagram showing a rotation angle of a sampling point according to an embodiment of the present disclosure.

The method for calculating the rotation angle is first described with reference to FIG. 5. Assuming that there are three sampling points f0, f1 and f2, the rotation angle of f1 with respect to the preceding sampling point f0 and the succeeding sampling point f2 (i.e., the angle formed by the vectors of f1 with respect to f0 and f2) may be an angle δ between the vector $\overrightarrow{T1}$ from f0 to f1 and the vector $\overrightarrow{T2}$ from f1 to f2. In embodiments of the present disclosure, the rotation angle of the first sampling point (i.e., the starting point) and the last sampling point (i.e., the end point) may be set to zero by default.

Because the sampling points in embodiments of the present disclosure include effective sampling points and ineffective sampling points, the rotation angle of the same sampling point may be in various types under different situations. In a situation, the rotation angle of a sampling point may be specified as an angle between vectors of the sampling point with respect to a preceding effective sampling point and a succeeding sampling point, which is hereinafter referred to as a first rotation angle. In another situation, the rotation angle of a sampling point may be specified as an angle between vectors of the sampling point with respect to two sampling points which are closest to the sampling point (the two sampling points may be effective sampling points or ineffective sampling points), which is hereinafter referred to as a second rotation angle. In another situation, the rotation angle of a sampling point may be specified as an angle between vectors of the sampling point with respect to a preceding effective sampling point and a succeeding effective sampling point, which is hereinafter referred to as a third rotation angle.

Taking the sampling point 7 shown in FIG. 3 as an example, an angle between a vector from the effective sampling point 5 to the sampling point 7 and a vector from the sampling point 7 to the sampling point 8 may be referred to as a first rotation angle of the sampling point 7. An angle between a vector from the sampling point 6 to the sampling point 7 and a vector from the sampling point 7 to the sampling point 8 may be referred to as a second rotation angle of the sampling point 7. An angle between a vector from the effective sampling point 5 to the sampling point 7 and a vector from the sampling point 7 to the effective sampling point 10 may be referred to as a third rotation angle of the sampling point 7.

Based on the above explanation of the rotation angle, in an embodiment of the present disclosure, the determination of whether a current sampling point is an effective sampling point according to the rotation angle of the current sampling point may include the following steps.

In S31, whether the first rotation angle of the current sampling point is greater than a first preset angle threshold is determined.

In S32, whether the sum of the second rotation angle of the current sampling point and second rotation angles of ineffective sampling points between the current sampling point and the preceding effective sampling point is greater than a second preset angle threshold is determined.

In S33, if the first rotation angle is greater than the first preset angle threshold, and/or the sun of the second rotation angle of the current sampling point and second rotation angles of ineffective sampling points between the current sampling point and the preceding effective sampling point is greater than a second preset angle threshold, the current sampling point is marked as an effective sampling point.

In the embodiment of the present disclosure, the two determination conditions in steps S31 and S32 are used to determine whether the current sampling point is a point which the sliding touch trajectory passes smoothly or an inflection point indicating the occurrence of direction change. As can be seen from the schematic diagram of the rotation angle as shown in FIG. 5, the larger the rotation angle of a sampling point, the higher the bending degree of the trajectory, and it is more likely that the sampling point is an inflection point.

Figure 6:
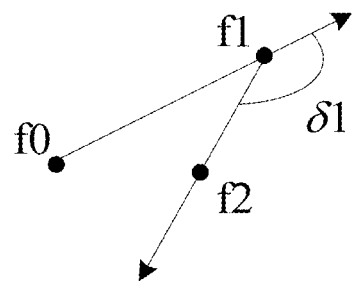
FIG. 6 is a schematic diagram showing a scenario in which a first rotation angle is greater than a first preset angle threshold according to an embodiment of the present disclosure.

Optionally, the first preset angle threshold may be set to be 120 degrees or other threshold values. As shown in FIG. 6, f1 is a to-be-determined current sampling point, f0 is the preceding effective sampling point of f1, f2 is the succeeding sampling point of f1, and the first rotation angle of f1 is δ1. Obviously, if δ1 is greater than 120 degrees, the sliding touch trajectory has a significant direction change at f1. Thus, f1 is an inflection point on the trajectory and it is very likely that f1 is a key effective sampling point.

Figure 7:
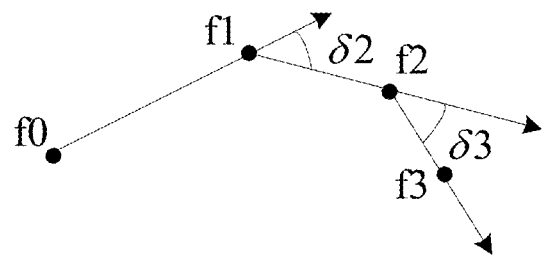
FIG. 7 is a schematic diagram showing a scenario in which the sum of second rotation angles is calculated according to an embodiment of the present disclosure.

Optionally, the second preset angle threshold may be set to be 45 degrees or other threshold values. As shown in FIG. 7, it is assumed that f2 is a to-be-determined current sampling point, f0 is the preceding effective sampling point, f1 is an ineffective sampling point between f0 and f2, and f3 is the succeeding sampling point of f2. According to step S32, the sum of the second rotation angle of the current sampling point f2 and second rotation angles of ineffective sampling points between f2 and the preceding effective sampling point f0 is calculated. That is, the sum of the second rotation angle δ3 of f2 and the second rotation angle δ2 of the ineffective sampling point f1 is calculated, i.e., δ'=δ2+δ3. The sum δ' of the rotation angles represents the smooth degree of the sliding touch trajectory. The smaller δ', the smoother the trajectory from f0 to f3. Thus, if the sum δ' is greater than the second preset angle, it is indicated that f2 may be an inflection point on the trajectory, and f2 should be taken as an effective sampling point.

How to determine whether a sampling point is an inflection point (i.e., the specific method for determining whether a sampling point should be taken as an effective sampling point) is described above with reference to FIGS. 5 to 7.

In other embodiments of the present disclosure, it is also possible to determine whether a sampling point is an effective sampling point according to both the candidate keys and the rotation angle of the sampling point. For example, for a current sampling point, steps S21 and S22 can be first performed. If the distance from the current sampling point to the common candidate key is the shortest, or if there is no common candidate key, steps S31 and S32 are further performed. If the first rotation angle of the current sampling point is greater than the first preset angle threshold, and the sum of the second rotation angle of the current sampling point and second rotation angles of ineffective sampling points between the current sampling point and the preceding effective sampling point is greater than the second preset angle threshold, the current sampling point is marked as an effective sampling point. That is, when the current sampling point meets both the determination conditions with respect to the candidate keys and the rotation angle, the current sampling point can be determined as an effective sampling point.

According to a possible implementation of the present disclosure, the determining of a skip probability of each of the effective sampling points and an occurrence probability of a candidate key corresponding to each of the effective sampling points in step S14 may include the following steps.

In S141, each effective sampling points is used as a current effective sampling point, and a third rotation angle, a sliding speed ratio and a shortest relative distance of the current effective sampling point are calculated.

In S142, according to the third rotation angle, the sliding speed ratio and the shortest relative distance, an attenuation calculation is performed on an initial value of a preset skip probability to obtain a skip probability of the current effective sampling point.

S143, according to distances between candidate keys corresponding to the current effective sampling point and the current effective sampling point, the occurrence probability of each of the candidate keys is determined, so that the sum of the occurrence probabilities of the candidate keys and the skip probability of the current effective sampling point is equal to one.

As can be seen from the above definition of the rotation angle, the third rotation angle refers to an angle between a fourth vector from a preceding effective sampling point to the current effective sampling point and a fifth vector from the current effective sampling point to a succeeding effective sampling point, which is hereinafter referred to as angle. As shown in FIG. 3, for the effective sampling point 3, the third rotation angle3 of the effective sampling point 3 is an angle between vectors from the effective sampling point 3 to the preceding and succeeding effective sampling points 1 and 5, i.e., an angle between a vector from the preceding effective sampling point 1 to the effective sampling point 3 and a vector from the effective sampling point 3 to the succeeding effective sampling point 5.

The sliding speed ratio refers to a ratio between an instantaneous speed of the current effective sampling point and an average speed of the sliding touch trajectory, which is hereinafter referred to as speed. The instantaneous speed refers to a ratio between the sum of distances from the current effective sampling point to a preceding sampling point and a succeeding sampling point of the current effective sampling point and a time difference between sampling time of the preceding sampling point and the succeeding sampling point of the current effective sampling point.

Referring to FIG. 3 again, the thirteen sampling points indicated by 1 to 13 are filtered to obtain six effective sampling points, i.e., the effective sampling points 1, 3, 5, 7, 10 and 13. First, the average speed V of the whole sliding touch trajectory (i.e., the ratio between the sum of the distances between two adjacent effective points and the sum of the sampling time) is calculated as follows:

$$V=(S_{1:3}+S_{3:5}+S_{5:7}+S_{7:10}+S_{10:13})/(t_{13}-t_1); \text{ or}$$

$$V=(S_{1:3}+S_{3:5}+S_{5:7}+S_{7:10}+S_{10:13})/(12*T).$$

In the above equations for calculating the average speed, S1:3 represents the distance between the effective sampling points 1 and 3, S3:5 represents the distance between the effective sampling points 3 and 5, S5:7 represents the distance between the effective sampling points 5 and 7, S7:10 represents the distance between the effective sampling points 7 and 10, and S10:13 represents the distance between the effective sampling points 10 and 13. Further, t13 represents the sampling time corresponding to the effective sampling point 13, t1 represents the sampling time corresponding to the effective sampling point 1, and T represents the sampling period.

For the effective sampling point 3, its instantaneous speed is $V3=(S2:3+S3:4)/(t4-t2)$, or $V3=(S2:3+S3:4)/(2*T)$, where S2:3 represents the distance from the effective sampling point 3 to the preceding sampling point 2, S3:4 represents the distance from the effective sampling point 3 to the succeeding sampling point 4, t2 represents the sampling time corresponding to the sampling point 2, and t4 represents the sampling time corresponding to the sampling point 4. Thus, the sliding speed ratio of the effective sampling point 3 is speed3=V3/V.

The shortest relative distance refers to a ratio between a shortest distance from the current effective sampling point to the candidate keys corresponding to the current effective sampling point and a key width of each key, which is hereinafter referred to as distance.

Referring to FIG. 3 again, for the effective sampling point 3, the candidate keys of the effective sampling point 3 include "g", "h", "t" and "y". By comparing the distances from the effective sampling point 3 to the central points of the four keys "g", "h", "t" and "y", it can be seen that the distance from the effective sampling point 3 to "g" is the shortest, and the distance is referred to as S3. Thus, the shortest relative distance corresponding to the effective sampling point 3 is distance3=S3/D, where D represents the width of a single key on the virtual keyboard (or the distance between the center points of two adjacent keys).

After obtaining the third rotation angle angle, the sliding speed ratio speed and the shortest relative distance distance of the current effective sampling point, the skip probability P(skip) of the current sampling point may be calculated according to the following equation: $P(skip)=w0*w1*w2*w3*w4*w5*w6$. The meanings of the seven parameters w0 to w6 and the method for determining the seven parameters will be described below.

1) The parameter w0 is the maximum skip probability, i.e., the preset initial value of the skip probability, and w0 is smaller than 1. The specific value of w0 may be determined via training manner such as machine learning and so on. For example, w0 may be set as 0.95.

The three parameters w1, w2 and w3 are used for linearly attenuating the preset initial value w0 of the skip probability according to the sliding speed ratio speed, the shortest relative distance distance and the third rotation angle angle of the current sampling point.

2) The parameter w1 is defined as $w1=\min(1, speed*a1+b1)$, where w1 is the parameter for attenuating the preset initial value w0 of the skip probability according to the sliding speed ratio speed of the current effective point, and is set as the minimum of 1 and speed*a1+b1. The values of the parameters a1 and b1 may be determined according to machine learning and so on. For example, a1 and b1 may be set as 0.5.

A small sliding speed ratio speed indicates that the speed when the user slides over the current sampling point is small, and it is very likely that the candidate keys associated with the current sampling point are keys that the user wants to input. According to the above equation, if a1 and b1 have been determined, the smaller the speed, the smaller the w1, and thus the smaller the skip probability P(skip).

3) The parameter w2 is defined as $w2=\min(1, \text{distance}*a2+b2)$, where w2 is the parameter for attenuating the preset initial value w0 of the skip probability according to the shortest relative distance distance of the current effective point, and is set as the minimum of 1 and distance*a2+b2. The values of the parameters a2 and b2 may be determined according to machine learning and so on. For example, a2 and b2 may be set as 0.5.

A small shortest relative distance distance indicates that the distance between the current effective sampling point and a certain candidate key is short (i.e., the current sampling point is inclined to be overlapped with the candidate key). Further, it is very likely that the candidate keys associated with the current sampling point are keys that the user wants to input, and the skip probability of this sampling point should be small. According to the above equation, if a2 and b2 have been determined, the smaller the distance is, the smaller the w2, and thus the smaller the skip probability P(skip).

4) The parameter w3 is defined as $w3=(1-\text{angle}/180)*a3+b3$, where w3 is the parameter for attenuating the preset initial value w0 of the skip probability according to the third rotation angle angle of the current effective point. The values of the parameters a3 and b3 may be determined according to machine learning and so on. For example, a3 may be set as 0.9, and b3 may be set as 0.1.

A large angle indicates that it is very likely that the current sampling point is an inflection point, and the skip probability of the current sampling point should be small. According to the above equation, if a3 and b3 have been determined, the greater the angle, the smaller the w3, and thus the smaller the skip probability P(skip).

5) The parameter w4 is used for recognizing the staying condition of the user on the approximately linear smooth trajectory during the user's sliding operation. For example, if the user wants to input "put", because "p", "u" and "t" are in the same straight line, the instantaneous speed when sliding over "u" will be relatively small.

Specifically, if the sliding speed ratio speed of the current effective sampling point is smaller than the sliding speed ratios of the preceding and succeeding effective sampling points, and the third rotation angle angle of the current effective sampling point is smaller than a third preset angle threshold (for example, 30 degrees), it can be considered that there is a stay at the current effective sampling point during the sliding operation and the skip probability of the current effective sampling point should be attenuated to some extent. Under such situation, w4 may be set as $w4=\min(1, \text{speed}*a4)$. The value of the parameter a4 may be determined according to machine learning and so on. For example, a4=0.6. On the contrary, if the sliding speed ratio speed or the third rotation angle angle of the current effective sampling point does not meet the above condition, w4 is set as 1, i.e., the skip probability of the current effective sampling point is not attenuated.

6) The parameter w5 is set as follows: if the third rotation angle angle of the current effective sampling point is greater than a fourth preset angle threshold, for example, 60 degrees, w5=a5; otherwise, w5=1, where a5 is smaller than 1, and the value of a5 may be determined according to machine learning and so on. For example, a5 may be set as 0.1.

The principle for setting the parameter w5 is as follows. If the third rotation angle angle of the current effective sampling point is large enough (e.g., equal to the fourth preset angle threshold), it is very likely that the current effective sampling point is an inflection point on the corresponding trajectory, and the probability that the current effective sampling point is to be skipped as an ineffective point is relatively small as compared with other points which the trajectory passes. Thus, by setting w5 as a5 which is smaller than 1, the skip probability of the current effective sampling point is attenuated to some extent to increase the occurrence probabilities of the candidate keys corresponding to the current effective sampling point.

7) The parameter w6 is set as follows: if the third rotation angle of the preceding effective sampling point of the current sampling point is smaller than a fifth preset angle threshold, for example, 15 degrees, and the third rotation angle angle of the current effective sampling point is greater than a sixth preset angle threshold, for example, 30 degrees, w6=a6; otherwise, w6=1, where a6 is smaller than 1. The value of a6 may be determined according to machine learning and so on. For example, a6 may be set as 0.4.

The principle for setting the parameter w6 is as follows. If the third rotation angle of the preceding effective sampling point of the current effective sampling point is small enough (e.g., smaller than or equal to the fifth preset angle threshold), it can be deemed that the trajectory before the current effective sampling point is approximately a straight line. Further, if the third rotation angle of the current effective sampling point is large enough to some extent, it can be deemed that the current effective sampling is an inflection point from which the trajectory starts to turn, and the probability that the current effective sampling point is to be skipped as an ineffective point is relatively small as compared with other points which the trajectory passes. Thus, it is necessary to attenuate the skip probability of the current effective sampling point by the parameter w6 to increase the occurrence probabilities of the candidate keys corresponding to the current effective sampling point.

As can be seen from the above technical solutions, in embodiments of the present disclosure, for each effective sampling point, the skip probability P(skip) of the effective sampling point is obtained by attenuating the preset initial value of the skip probability with various factors considered, including the rotation angle, the sliding speed of the effective sampling point, and the distances from the effective sampling point to the candidate keys and so on.

In this way, the more likely that the effective sampling point is an inflection point or a stay point, the smaller the skip probability of the effective sampling point. This can ensure that the candidate keys of key sampling points may have a higher probability to appear in a candidate character sequence, and the candidate probability may be larger. Consequently, there is a higher matching degree between the candidate words output earlier and the input content desired by the user, such that the input accuracy and input efficiency are improved.

In embodiments of the present disclosure, after obtaining the skip probabilities of the effective sampling points, in the premise that the sum of the skip probability of each effective sampling point and occurrence probabilities of candidate keys of the effective sampling point is equal to 1, the occurrence probabilities of the candidate keys are determined according to the distances from the effective sampling point to the candidate keys. The candidate keys which are farther from the effective sampling point may have smaller occurrence probabilities.

For example, for the effective sampling point 3 shown in FIG. 3, if it is assumed that the skip probability of the effective sampling point 3 is 0.22, the sum of the occurrence probabilities of the candidate keys "g", "h", "t" and "y" is 0.78. If it is further assumed that, after calculation, the distances from the center points of the four candidate keys to the effective sampling point 3 are 1 mm, 3 mm, 5 mm, and 5 mm, respectively, i.e., the distance ratio is 1:3:5:5, the ratio of the occurrence probabilities of the candidate keys may be in inverse proportion to the distance ration, i.e., the ratio of the occurrence probabilities may be 15:5:3:3. The probability sum 0.78 may be allocated according to the ratio of 15:5:3:3 as follows: the occurrence probability of the candidate key "g" is 0.45, the occurrence probability of the candidate key "h" is 0.15, and the occurrence probability of each of the candidate keys "t" and "y" is 0.09.

According to the above steps S141 to S143 and the specific implementations thereof, the statistical probability result corresponding to any one sliding touch trajectory as shown in Table 1 may be obtained. Further, according to the statistical result, the candidate probability corresponding to each candidate character sequence or candidate word may be calculated, and the candidate words can be displayed in a descending order of the candidate probabilities of the candidate words. Thus, with respect to the input methods based on point touch, the technical solutions provided by embodiments of the present disclosure have a higher error-tolerant rate, and impose lower requirements on user input accuracy, which further improve input efficiency.

Figure 8:
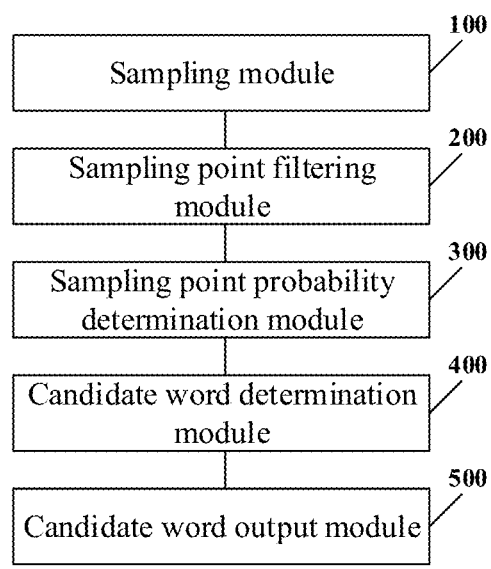
FIG. 8 is a block diagram showing a text input device according to an embodiment of the present disclosure.

FIG. 8 is a block diagram showing a text input device according to an embodiment of the present disclosure. The device may be applied in any electronic apparatus having a touch screen to execute the text input method according to any one of the previously-described embodiments.

As shown in FIG. 8, the text input devices includes a sampling module 100, a sampling point filtering module 200, a sampling point probability determination module 300, a candidate word determination module 400, and a candidate word output module 500.

The sampling module 100 is configured to sample a sliding touch trajectory detected by a terminal apparatus to obtain a plurality of sampling points, and record sampling information of each sampling point. The sampling information includes at least coordinate information of each sampling point.

The sampling point filtering module 200 is configured to determine one or more candidate keys corresponding to each sampling point based on the coordinate information of each sampling point, and filter the sampling points according to the candidate keys to obtain effective sampling points.

The sampling point probability determination module 300 is configured to determine a skip probability of each of the effective sampling points, and an occurrence probability of a candidate key corresponding to each of the effective sampling points.

The candidate word determination module 400 is configured to obtain candidate words according to combinations of candidate keys corresponding to the effective sampling points, and determine a candidate probability of each of the candidate words according to the skip probability and the occurrence probability.

The candidate word output module 500 is configured to output the candidate words in a descending order of candidate probabilities of the candidate words.

As can be seen from the above technical solutions, by the embodiments of the present disclosure, the user does not need to tap and release his/her finger or touch pen for many times to input the target characters, and he/she can instead perform one sliding operation to make the sliding touch trajectory pass all the target characters. During this procedure, the user's finger or touch pen does not need to leave the virtual keyboard, and the transition from one character to another character is realized by the sliding operation. For each input, only one tape and releasing action is needed, which can greatly reduce user's input actions, and make the input procedure continuous. Consequently, the input speed and efficiency can be improved.

In addition, embodiments of the present do not require that one candidate key has to appear in a candidate character sequence. Instead, embodiments of the present disclosure calculate the occurrence probability of each candidate key and the skip probability of each effective sampling point, determine whether various combinations of the candidate keys can result in a meaningful character sequence according to a language model, calculate the candidate probability associated with each meaningful character sequence according to the occurrence probability and the skip probability, and output the candidate words in a descending order of the candidate probabilities. As compared with the input methods based on point touch, the technical solutions provided by embodiments of the present disclosure have a higher error-tolerant rate and impose lower requirements on user input accuracy, thereby further improving the input efficiency.

In a possible implementation of the present disclosure, the sampling point filtering module 200 may include:

a candidate key determination module configured to, for each sampling point, calculate distances between the sampling point and keys on a virtual keyboard according to the coordinate information, and select keys showing distances to the sampling point smaller than a preset distance threshold as the candidate keys corresponding to the sampling point;

a first filtering module configured to determine whether the sampling points are effective sampling points according to the candidate keys; and a second filtering module configured to calculate a rotation angle of each of the sampling points and determine whether each of the sampling points is an effective sampling point according to the rotation angle.

In the implementation, using the first filtering module and the second filtering module, whether a sampling point is an effective point that matches a user's real input intention may be determined based on candidate keys corresponding to each sampling point and the rotation angle of the sampling point. Thus, redundant ineffective sampling points may be removed and the obtaining of candidate words by combinations of candidate keys may be facilitated.

In a possible implementation of the present disclosure, the sampling point probability determination module 300 is configured to:

use each effective sampling point as a current effective sampling point, and calculate a third rotation angle of the current effective sampling point, a sliding speed ratio of the current effective sampling point, and a shortest relative distance of the current effective sampling point;

according to the third rotation angle, the sliding speed ratio and the shortest relative distance, perform an attenuation calculation on an initial value of a preset skip probability to obtain a skip probability of the current effective sampling point; and according to distances between candidate keys corresponding to the current effective sampling point and the current effective sampling point, determine the occurrence probability of the candidate keys, so that the sum of the occurrence probabilities of the candidate keys and the skip probability of the current effective sampling point is equal to one.

The third rotation angle refers to an angle between a fourth vector from a preceding effective sampling point to the current effective sampling point and a fifth vector from the current effective sampling point to a succeeding effective sampling point.

The sliding speed ratio refers to a ratio between an instantaneous speed of the current effective sampling point and an average speed of the sliding touch trajectory. Further, the instantaneous speed refers to a ratio between the sum of distances from the current effective sampling point to a preceding sampling point and a succeeding samplings point of the current effective sampling point and a time difference between sampling time of the preceding sampling point and the succeeding sampling point of the current effective sampling point.

The shortest relative distance refers to a ratio between a shortest distance from the current effective sampling point to the candidate keys corresponding to the current effective sampling point and a key width of a single key.

In the implementation, for each effective sampling point, the skip probability of the effective sampling point is obtained by attenuating the preset initial value of the skip probability with various factors considered, including the rotation angle and the sliding speed of the effective sampling point and the distances from the effective sampling point to the candidate keys and so on. In this way, the more likely that the effective sampling point is an inflection point or a stay point, the smaller the skip probability of the effective sampling point. This can ensure that the candidate keys of key sampling points may have a larger probability to appear in a candidate character sequence, and the candidate probability may be larger. Consequently, there is a higher matching degree between the earlier output candidate words and the input content desired by the user, which improves the input accuracy and the input efficiency.

Further, embodiments of the present disclosure provide a terminal apparatus, including a touch screen, a memory and a processor.

The touch screen is configured to display a virtual keyboard, and sense a sliding touch operation to obtain a sliding touch trajectory. The memory is configured to store computer executable instructions. The processor is configured to call the computer executable instructions stored in the memory to allow the terminal apparatus to perform a part of or all the steps of the text input method according to any one of the above embodiments.

The terminal apparatus may be an electronic device such as a smart phone, or a tablet computer and the like.

Embodiments of the present disclosure further provide a computer readable storage medium. The computer readable storage medium stores programs therein, and when executed, the programs are configured to perform a part of or the entire text input method according to any one of the present disclosure. The storage medium may be a magnetic disk, an optical disk, a Read-Only Memory (ROM), or a Random Access Memory (RAM) and so on.

It is apparent to one of ordinary skill in this art that the technologies in embodiments of the present disclosure may be implemented by software plus necessary general hardware platform(s). Based on such understanding, the technical solutions provided by embodiments of the present disclosure or the portion of the present disclosure which contributes over prior arts are in essence embodied b software products, and such computer software product may be stored in a storage medium, for example, ROM/RAM, a magnetic disk, an optical disk and so on. The storage medium stores a set of instructions to cause a computing device (for example, a personal computer, a server, or a network device) to perform the methods according to a part or whole of the embodiments of the present disclosure.

The same or similar parts may be shared between embodiments of the present disclosure. Particularly, the specific implementations of the device and the terminal apparatus are basically the same as that of the embodiments of the methods, and the description of the text input device and the terminal apparatus are relatively brief, and details can be found in the descriptions regarding the embodiments of the method.

The above embodiments of the present disclosure are not intended to limit the scope of the present disclosure.

What is claimed is:

1. A text input method, comprising:
sampling a sliding touch trajectory received by a terminal apparatus to obtain a plurality of sampling points, and recording sampling information of each sampling point, wherein the sampling information comprises at least coordinate information of each sampling point;
determining one or more candidate keys corresponding to each sampling point based on the coordinate information of each sampling point, and filtering the sampling points according to the candidate keys to obtain effective sampling points;
with the effective sampling points being successively taken as a current effective sampling point, calculating a first rotation angle, a sliding speed ratio, and a shortest relative distance of the current effective sampling point;
according to the first rotation angle, the sliding speed ratio, and the shortest relative distance, performing an attenuation calculation on an initial value of a preset skip probability to obtain a skip probability of the current effective sampling point; and
according to distances between candidate keys corresponding to the current effective sampling point and the current effective sampling point, determining occurrence probabilities of the candidate keys, so that a sum of the occurrence probabilities of the candidate keys and the skip probability of the current effective sampling point is equal to one, wherein:
the first rotation angle refers to an angle between a first vector from a preceding effective sampling point to the current effective sampling point and a second vector from the current effective sampling point to a succeeding effective sampling point,
the sliding speed ratio refers to a ratio between an instantaneous speed of the current effective sampling point and an average speed of the sliding touch trajectory, and the instantaneous speed refers to a ratio between a sum of distances from the current effective sampling point to a preceding sampling point and a succeeding sampling point of the current effective sampling point and a time difference between sampling time of the preceding sampling point and the succeeding sampling point of the current effective sampling point, and
the shortest relative distance refers to a ratio between a shortest distance from the current effective sampling point to the candidate keys corresponding to the current effective sampling point and a key width of a single key;
obtaining candidate words according to combinations of candidate keys corresponding to the effective sampling points, and determining a candidate probability for each of the candidate words according to the skip probability and the occurrence probability; and outputting the candidate words in a descending order of candidate probabilities of the candidate words.

2. The method according to claim 1, wherein determining the one or more candidate keys corresponding to each sampling point based on the coordinate information of each sampling point, comprises:
for each sampling point, calculating distances between the sampling point and keys on a virtual keyboard according to the coordinate information; and
selecting keys that show distances to the sampling point smaller than a preset distance threshold as the candidate keys corresponding to the sampling point.

3. The method according to claim 1, wherein filtering the sampling points according to the candidate keys to obtain the effective sampling points, comprises:
marking a first sampling point corresponding to a starting point of the sliding touch trajectory as an effective sampling point; and
with the sampling points except the first sampling point successively being taken as the current sampling point, determining whether the current sampling point is an effective sampling point according to a candidate key and/or a rotation angle of the current sampling point;
wherein the rotation angle comprises a second rotation angle and a third rotation angle, the second rotation angle refers to an between a third vector from a preceding effective sampling point of the current sampling point to the current sampling point and a fourth vector from the current sampling point to a succeeding neighbor sampling point, and the third rotation angle refers to an angle between a fifth vector from a preceding sampling point to the current sampling point and the fourth vector.

4. The method according to claim 3, wherein determining whether the current sampling point is the effective sampling point according to the candidate key of the current sampling point, comprises:
determining whether there is a common candidate key shared by the current sampling point and the preceding effective sampling point, or shared by the current sampling point and the succeeding sampling point;
if there is the common candidate key, determining whether the current sampling point is the closest to the common candidate key as compared with the preceding effective sampling point and the succeeding sampling point; and
if the current sampling point is the closest to the common candidate key, or if there is no common candidate key, marking the current sampling point as an effective sampling point.

5. The method according to claim 3, wherein determining whether the current sampling point is the effective sampling point according to the rotation angle of the current sampling point, comprises:
determining whether the second rotation angle of the current sampling point is greater than a first preset angle threshold, or determining whether the sum of the third rotation angle of the current sampling point and the third rotation angles of ineffective sampling points between the current sampling point and the preceding effective sampling point is greater than a second preset angle threshold; and
if the second rotation angle is greater than the first preset angle threshold, and/or the sum of the third rotation angle of the current sampling point and the third rotation angles of ineffective sampling points between the current sampling point and the preceding effective sampling point is greater than the second preset angle threshold, marking the current sampling point as the effective sampling point.

6. The text input method according to claim 1, wherein filtering the sampling points according to the candidate keys to obtain the effective sampling points, comprises:
determining whether the sampling points are effective sampling points according to the candidate keys; and
calculating a rotation angle of each of the sampling points and determining whether each of the sampling points is an effective sampling point according to the rotation angle.

7. A text input device, comprising processor that is configured to:
sample a sliding touch trajectory received by a terminal apparatus to obtain a plurality of sampling points, and record sampling information of each sampling point, wherein the sampling information comprises at least coordinate information of each sampling point;
determine one or more candidate keys corresponding to each sampling point based on the coordinate information of each sampling point, and filter the sampling points according to the candidate keys to obtain effective sampling points;
with the effective sampling points being successively taken as a current effective sampling) point, calculate a first rotation angle, a sliding speed ratio, and a shortest relative distance of the current effective sampling point;
according to the first rotation angle, the sliding speed ratio, and the shortest relative distance, perform an attenuation calculation on an initial value of a preset skip probability to obtain a skip probability of the current effective sampling point; and
according to distances between candidate keys corresponding to the current effective sampling point and the current effective sampling point, determine occurrence probabilities of the candidate keys, so that a sum of the occurrence probabilities of the candidate keys and the skip probability of the current effective sampling point is equal to one, wherein:
the first rotation angle refers to an angle between a first vector from a preceding effective sampling, point to the current effective sampling point and a second vector from the current effective sampling point to a succeeding effective sampling point,
the sliding speed ratio refers to a ratio between an instantaneous speed of the current effective sampling point and an average speed of the sliding touch trajectory, and the instantaneous speed refers to a ratio between a sum of distances from the current effective sampling point to a preceding sampling point and a succeeding sampling point of the current effective sampling point and a time difference between sampling time of the preceding sampling point and the succeeding sampling point of the current effective sampling point, and
the shortest relative distance refers to a ratio between a shortest distance from the current effective sampling point to the candidate keys corresponding to the current effective sampling point and a key width of a single key;
obtain candidate words according to combinations of candidate keys corresponding to the effective sampling points, and determine a candidate probability of each of the candidate words according to the skip probability and the occurrence probability; and output the candidate words in a descending order of candidate probabilities of the candidate words.

8. The device according to claim 7, wherein the processor is further configured to:
for each sampling point, calculate distances between the sampling point and keys on a virtual keyboard according to the coordinate information, and select keys showing distances to the sampling point smaller than a preset distance threshold as the candidate keys corresponding to the sampling point;
determine whether the sampling points are effective sampling points according to the candidate keys; and
calculate a rotation angle of each of the sampling points and determine whether each of the sampling points is an effective sampling point according to the rotation angle.

9. A terminal apparatus, comprising a touch screen, a memory and a processor, wherein:
the touch screen is configured to display a virtual keyboard, and sense a sliding touch operation to obtain a sliding touch trajectory;
the memory is configured to store computer executable instructions;
the processor is configured to call the computer executable instructions stored in the memory to enable the terminal apparatus to:
sample a sliding touch trajectory received by a terminal apparatus to obtain a plurality of sampling points, and record sampling information of each sampling point, wherein the sampling information comprises at least coordinate information of each sampling point;
determine one or more candidate keys corresponding to each sampling point based on the coordinate information of each sampling point, and filter the sampling points according to the candidate keys to obtain effective sampling points;
with the effective sampling points being successively taken as a current effective sampling point, calculate a first rotation angle, a sliding speed ratio, and a shortest relative distance of the current effective sampling point;
according to the first rotation angle, the sliding speed ratio, and the shortest relative distance, perform an attenuation calculation on an initial value of a preset skip probability to obtain a skip probability of the current effective sampling point; and
according to distances between candidate keys corresponding to the current effective sampling point and the current effective sampling point, determine occurrence probabilities of the candidate keys, so that a sum of the occurrence probabilities of the candidate keys and the skip probability of the current effective sampling point is equal to one, wherein:
the first rotation angle refers to an angle between a first vector from a preceding effective sampling point to the current effective sampling point and a second vector from the current effective sampling point to a succeeding effective sampling point,
the sliding speed ratio refers to a ratio between an instantaneous speed of the current effective sampling point and an average speed of the sliding touch trajectory, and the instantaneous speed refers to a ratio between a sum of distances from the current effective sampling point to a preceding sampling point and a succeeding sampling point of the current effective sampling point acrd a time difference between sampling time of the preceding sampling point and the succeeding sampling point of the current effective sampling point, and
the shortest relative distance refers to a ratio between a shortest distance from the current effective sampling point to the candidate keys corresponding to the current effective sampling point and a key width of a single key;
obtain candidate words according to combinations of candidate keys corresponding to the effective sampling points, and determine a candidate probability of each of the candidate words according to the skip probability and the occurrence probability; and
output the candidate words in a descending order of candidate probabilities of the candidate words.

10. The apparatus according to claim 9, wherein the processor is further configured to:
for each sampling point, calculate distances between the sampling point and keys on a virtual keyboard according to the coordinate information; and
select keys that show distances to the sampling point smaller than a preset distance threshold as the candidate keys corresponding to the sampling point.

11. The apparatus according to claim 9, wherein the processor is further configured to:
mark a first sampling point corresponding to ng point of the sliding touch trajectory as an effective sampling point; and
with the sampling points except the first sampling point successively being taken as the current sampling point, determine whether the current sampling point is an effective sampling point according to a candidate key and/or a rotation angle of the current sampling point;
wherein the rotation angle comprises a second rotation angle and a third rotation angle, the second rotation angle refers to an angle between a third vector from a preceding effective sampling point of the current sampling point to the current sampling point and a fourth vector from the current sampling point to a succeeding neighbor sampling point, and the third rotation angle refers to an angle between a fifth vector from a preceding sampling point to the current sampling point and the fourth vector.

12. The apparatus according to claim 11, wherein the processor is further configured to:
determine whether there is a common candidate key shared by the current sampling point and the preceding effective sampling point, or shared by the current sampling point and the succeeding sampling point;
if there is the common candidate key, determine whether the current sampling point is the closest to the common candidate key as compared with the preceding effective sampling point and the succeeding sampling point; and
if the current sampling point is the closest to the common candidate key, or if there is no common candidate key, mark the current sampling point as an effective sampling point.

13. The apparatus according to claim 11, wherein the processor is further configured to:
determine whether the second rotation angle of the current sampling point is greater than a first preset angle threshold, or determine whether the sum of the third rotation angle of the current sampling point and the third rotation angles of ineffective sampling points between the current sampling point and the preceding effective sampling point is greater than a second preset angle threshold; and if the second rotation angle is greater than the first preset angle threshold, and/or the sum of the third rotation angle of the current sampling point and the third rotation angles of ineffective sampling points between the current sampling point and the preceding effective sampling point is greater than the second preset angle threshold, mark the current sampling point as the effective sampling point.

14. The apparatus according to claim 9, wherein the processor is further configured to:
   determine whether the sampling points are effective sampling points according to the candidate keys; and
   calculate a rotation angle of each of the sampling points and determine whether each of the sampling points is an effective sampling point according to the rotation angle.

* * * * *